United States Patent
Zehnder et al.

(10) Patent No.: US 6,268,883 B1
(45) Date of Patent: Jul. 31, 2001

(54) HIGH SPEED INFRARED IMAGING SYSTEM AND METHOD

(75) Inventors: Alan T. Zehnder, Ithaca, NY (US); Ares J. Rosakis, Altadena; G. Ravichandran, Arcadia, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/087,735

(22) Filed: May 29, 1998

Related U.S. Application Data

(60) Provisional application No. 60/048,148, filed on May 30, 1997.

(51) Int. Cl.[7] .................................. H04N 5/33; G01J 5/00
(52) U.S. Cl. ...................... 348/164; 348/166; 250/338.1; 250/339.02
(58) Field of Search ..................................... 348/162, 163, 348/164, 166; 356/51; 250/330, 332, 334, 338.1, 339.02, 370.08

(56) References Cited

U.S. PATENT DOCUMENTS

| | | | | |
|---|---|---|---|---|
| 3,798,366 | * | 3/1974 | Hunt et al. ........................ | 374/124 |
| 3,807,873 | * | 4/1974 | Nakamori ......................... | 356/188 |
| 3,909,521 | * | 9/1975 | Hunt et al. ....................... | 348/167 |
| 3,952,151 | * | 4/1976 | Jenkin ............................. | 348/208 |
| 3,983,395 | * | 9/1976 | Kim ............................ | 250/370.08 |
| 4,009,962 | * | 3/1977 | Lauer et al. ...................... | 356/346 |
| 4,335,400 | * | 6/1982 | Chow et al. ..................... | 348/166 |
| 4,338,627 | * | 7/1982 | Stapleton ........................ | 348/164 |
| 4,419,692 | * | 12/1983 | Modisette et al. ................ | 348/167 |
| 4,869,256 | * | 9/1989 | Kanno et al. .................... | 600/440 |
| 5,040,889 | * | 8/1991 | Keane ............................. | 356/51 |
| 5,095,211 | * | 3/1992 | Kimata ...................... | 250/370.08 |
| 5,394,237 | * | 2/1995 | Chang et al. .................... | 356/328 |
| 5,449,910 | * | 9/1995 | Wood et al. .................. | 250/338.1 |
| 5,587,583 | * | 12/1996 | Chin et al. ...................... | 250/332 |
| 5,663,562 | * | 9/1997 | Jones et al. ..................... | 250/332 |
| 5,682,035 | * | 10/1997 | Gallagher et al. ................ | 250/332 |

* cited by examiner

*Primary Examiner*—Vu Le
(74) *Attorney, Agent, or Firm*—Fish & Richardson P.C.

(57) ABSTRACT

A system and method for radiation detection with an increased frame rate. A semi-parallel processing configuration is used to process a row or column of pixels in a focal-plane array in parallel to achieve a processing rate up to and greater than 1 million frames per second.

16 Claims, 3 Drawing Sheets

HIGH SPEED INFRARED IMAGING SYSTEM AND METHOD

This application claims the benefit of U.S. Provisional Application No. 60/048,148 filed on May 30, 1997, which is incorporated herein by reference.

ORIGIN OF THE INVENTION

The United States Government has certain rights in this invention pursuant to the following grants from the National Science Foundation Grant No. CTS-9512517, Office of Naval Research Grant No. N00014-95-1-0453, and the Department of Energy Grant No. DE-FG03-95-ER14560.

FIELD OF THE INVENTION

The present invention relates to imaging systems and methods, and more specifically to imaging in an infrared spectrum.

BACKGROUND OF THE INVENTION

Infrared ("IR") sensing arrays are widely used to capture images of objects that radiate in the infrared spectrum in applications such as industrial inspection, surveillance, and infrared astronomy. Each element of such sensing arrays has an infrared detector that reacts either to individual incident photons or to the total thermal energy caused by absorption of the incident photons to produce an electrical signal. The electrical signals produced by the sensing array are read out and processed to produce a digital electronic image indicative of an input IR scene.

An IR focal-plane array ("FPA") is an IR sensing array located in a focal plane of an optical imaging module that collects the radiation from a target object so that the image of the target object is focused onto the IR sensing array. Two different configurations, monolithic and hybrid configurations, are usually used to form a photosensing IR FPA. A monolithic FPA has both IR-sensing material and electrical signal transmission paths on the same semiconductor layer. A hybrid FPA separates the IR-sensing material and electrical signal transmission paths into two layers which are aligned with each other and are interconnected with conducting elements (e.g., indium bumps).

However implemented, the image captured by the FPA needs to be read out to a subsequent signal processing circuit. The amount of information contained in the image increases with the number of pixels in the EPA. The speed of transferring this data usually forms the bottle neck of the data processing and significantly affects the frame rate of the imaging system.

High-speed IR images are desired in many applications that sense a moving object or certain transient phenomena such as a rapid change in the object temperature. Conventional IR imaging systems use different approaches to increase the frame rates.

For example, one technique implements one or more moving mirrors to achieve high frame rates. An IR imaging device manufactured by Ellis Camera Company is such an example. A polygon mirror with 6 facets may spin at a rate of 20,000 rotations per second. This produces a frame rate of 120,000 frames per second. A higher frame rate using this technique is usually difficult to achieve due to the inherent limitations of material strength and mirror balance.

Another technique implements a partially parallel data acquisition scheme in a FPA system to achieve a frame rate up to about 32,000 frames per second. Amber infrared camera developed for Wayne State University, connects four digitizers in parallel with respect to one another to simultaneously read out and digitize signals from four adjacent pixels in the FPA. An image is captured by scanning out data from the FPA with four pixels at a time.

The present invention provides an infrared imaging system and method based on a FPA to achieve imaging frame rates up to and greater than about 1 million frames per second.

SUMMARY OF THE INVENTION

The present invention is imbedded in an IR imaging system having an imaging optical module, a focal-plane array, and an electronic signal processing module. The imaging optical module receives radiation from a target object and produces an image of the object onto the FPA which converts the radiation image into an array of electrical signals. The electronic signal processing module connects to the FPA and converts the electrical signals into a digital representation of the received radiation image.

The imaging optical module is preferably placed relative to the FPA to form the image of the object with a desired magnification on the FPA. One implementation of this imaging optical module includes four spherical reflectors to form one pair of Schwarzchild systems. Each Schwarzchild system has one convex spherical reflector and one concave spherical reflector that are confocal with respect to each other. The two Schwarzchild systems are placed in an infinite conjugation configuration so that the ratio of the focal lengths of the two Schwarzchild systems determines the magnification factor of the imaging optical module.

One advantage of such doubled Schwarzchild systems is that the magnification of the image formed on the FPA can be easily adjusted to meet the requirements of certain applications.

The electronic signal processing module uses a semi-parallel configuration to improve the data readout rate from the FPA. In a preferred embodiment, the electronic signal processing module includes a plurality of preamplifier circuits each corresponding to a different pixel element in the FPA, a plurality of multiplexer circuits each connected to a row or column of pixel elements in the FPA, and a plurality of digitizers each of which corresponds to a multiplexer circuit. The data in all pixel elements in the FPA is read out in parallel to the preamplifier circuits. The multiplexer circuits are each connected to the preamplifier circuits such that each multiplexer circuit corresponds to a row or column of pixels. Each multiplexer circuit is configured to have at least the same number of input terminals as the number of pixels in a row or column of the FPA so that the data from all preamplifier circuits can be simultaneously received in parallel. The output from each multiplexer circuit is sequential, i.e., the parallel input data from a row or column of the FPA is exported one pixel at a time to the respective digitizer. Each digitizer converts the analog signals from the multiplexer into digital data. One or more memory units may be incorporated in the digitizer to temporarily store the converted data.

These and other aspects and advantages of the invention will become more apparent in light of the accompanying drawings, detailed description of the preferred embodiments, and appended claims.

DETAILED DESCRIPTION OF THE PREFERRED EMBODIMENTS

Figure 1:
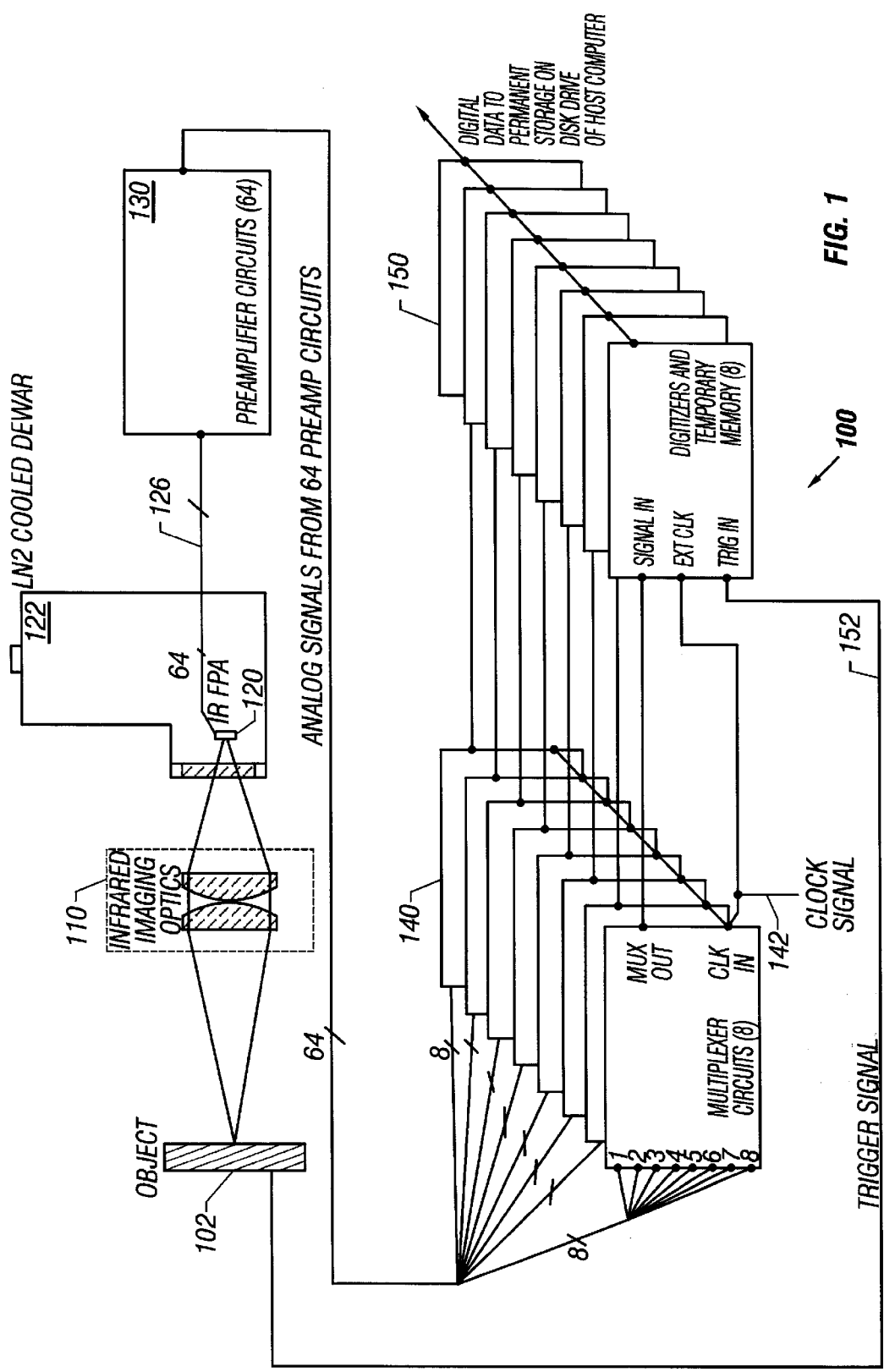
FIG. 1 is a schematic of an infrared FPA system 100 implementing a semi-parallel configuration according to one embodiment of the invention.

FIG. 1 shows one embodiment 100 of the infrared imaging system of the invention. The system 100 includes an imaging optical module 110, a focal-plane array FPA 120, and an electronic signal processing module which has preamplifier circuits 130, multiplexer circuits 140, and digitizers 150. The imaging optical module 110 receives radiation from a target object 102 and produces an image of the object 102 onto the FPA 120 which converts the radiation image into an array of electrical signals. The electronic signal processing module connects to the FPA 120 and converts the electrical signals into a digital representation of the received radiation image. The digital data from the digitizers 150 can be further routed to a permanent storage device or a computer (not shown).

The imaging optical module 110 may include a lens, a lens assembly, or any other suitable optical imaging device. Preferably, the imaging optical module 110 is placed relative to the FPA 120 to form an image of the object 102 with a desired magnification on the FPA 120. This may be implemented in various forms. One exemplary implementation is a lens assembly having two convex lenses of different focal lengths as shown in FIG. 1. The ratio of the focal lengths can be adjusted to achieve the desired magnification.

Figure 2:
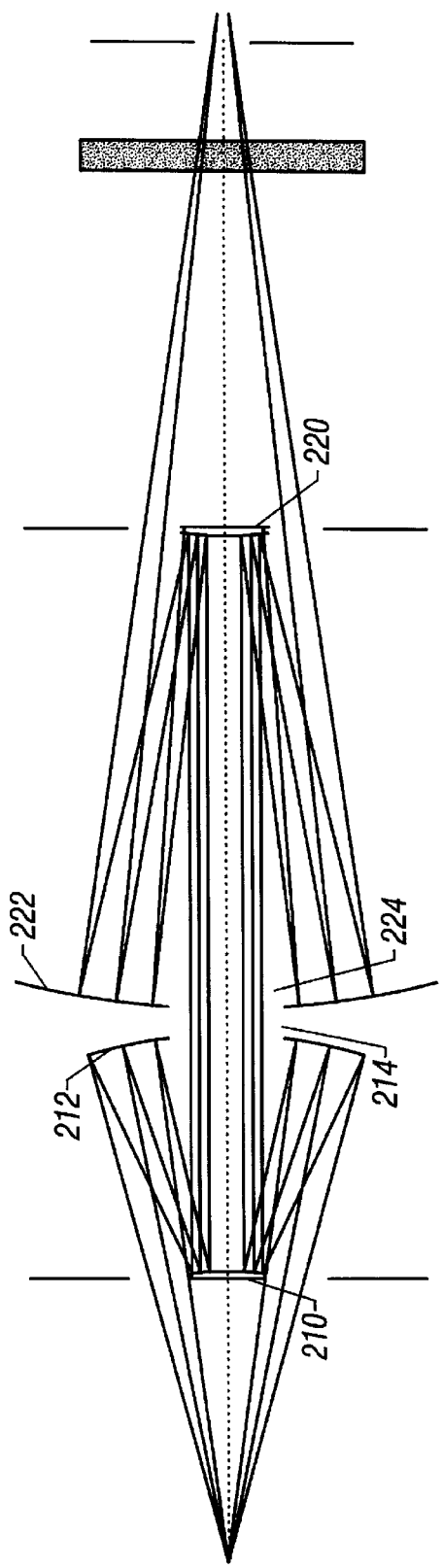
FIG. 2 is a diagram illustrating one embodiment of the optical imaging module using four spherical reflectors to form a pair of Schwarzchild systems.

FIG. 2 is schematic diagram of another implementation 200 of the optical imaging module 110. Two convex spherical reflectors 210, 220 and two concave spherical reflectors 212 and 222 are used. The convex spherical reflector 210 and the concave spherical reflector 212 are configured to form a Schwarzchild system as disclosed in Rudolf Kingslake, "Lens Design Fundamentals", page 331, Academic Press, New York (1978). The concave spherical reflector 212 has a radius of curvature greater than a radius of curvature of the convex spherical reflector 210. The reflectors 210 and 212 are disposed in such a way that the convex and concave surfaces are confocal relative to each other, i.e., the focal points of the two reflecting surfaces overlap. The concave reflector 212 has a central aperture 214 for directing a beam in or out of the Schwarzchild system. Similarly, the convex spherical reflector 220 and the concave spherical reflector 222 having a central aperture 224 form another Schwarzchild system as shown. The two Schwarzchild systems are placed in an infinite conjugation configuration so that the ratio of the focal lengths of the two convex reflectors 210 and 220 determines the magnification factor of the imaging optical module.

The magnification of the image formed on the FPA can be easily adjusted to meet the requirements of certain applications. When the image of only a small portion on an object is needed, for example, the optical imaging module can be configured to image only the small portion of interest onto the FPA. The entire object may also be imaged onto the FPA by reconfiguring the two Schwarzchild systems when desired.

Referring back to FIG. 1, the FPA 120 in general can include any IR sensing array having sensing pixels that react either to individual incident photons (e.g., a semiconductor photosensing array) or to the total thermal energy caused by absorption of the incident photons (e.g., a mircrobolometer array). A range of semicondcutor materials may be used to construct a photosensing array to perform photosensing detection at different wavelengths. For example, the semicondcutor compound mercury cadmium telluride (HgCdTe) is widely used for detection in a spectral range from about 5 $\mu$m to about 11 $\mu$m. Certain aspects of HgCdTe detectors are described by Chu et al. in "Commercialization of LPE HgCdTe Material, Detectors, and Arrays," pp. 194–200, SPIE vol. 2228, which is incorporated herein by reference. As illustrated in FIG. 1, such a HgCdTe hybrid FPA (e.g., 8 by 8 array) may be placed in a cooled dewar 122 to reduce the infrared background noise. The detector pixels in the sensing array are bonded to a fan-out board by using indium bumps. A bundle of electrical wires 126 are respectively connected to all detector pixels and to route the signals from the FPA 120 outside the dewar 122 to the electronic signal processing module. Alternatively, a monolithic FPA may be used to practice the invention.

The electronic signal processing module uses a semi-parallel configuration to improve the data readout rate from the FPA 120. The electrical signals from all pixels of the FPA 120 are read out to the multiplexer circuits 140 in parallel while the data are subsequently sent to the digitizers 150 in a semi-parallel manner, i.e., one column or one row to each digitizer. Each of the multiplexer circuits 140 is configured to track and hold signals from respective preamplifiers corresponding to one row or column of pixels in the FPA 120 based on a clock signal 142 common to all multiplexer circuits 140. For each input, a multiplexer has a track-and-hold amplifier which receives and holds a signal from that input in response to a clock pulse until the arrival of the next clock pulse.

In operation, a clock pulse in a clock signal 142 triggers all multiplexer circuits 140 to receive and hold signals from the preamplifiers 130. These signals form one frame of the detected image by the FPA 120. Each multiplexer circuit holds signals from one column or row of pixels in the FPA 120 in response to a pulse in the clock signal. Upon arrival of a subsequent clock pulse, these signals are then read out one pixel at a time from each multiplexer circuit and all multiplexer circuits are read out simultaneously. The signals coming out of the multiplexers are read by the digitizers 150 each including an analog-to-digital converter. The number of digitizers 150 should be at least the number of parallel multiplexer circuits 140.

When the entire frame is readout, the next clock pulse in the clock signal 142 triggers the multiplexer circuits 140 to reset and receive another frame of signals. Thus, the clock frequency is at least the product of the frame rate and the number of inputs to each multiplexer circuit.

Therefore, signals from a single frame are captured at the same instant in time but are processed at different times by the digitizers 150. This allows for determination of the instantaneous temperature and temporal variation in temperature of a target object.

Figure 3:
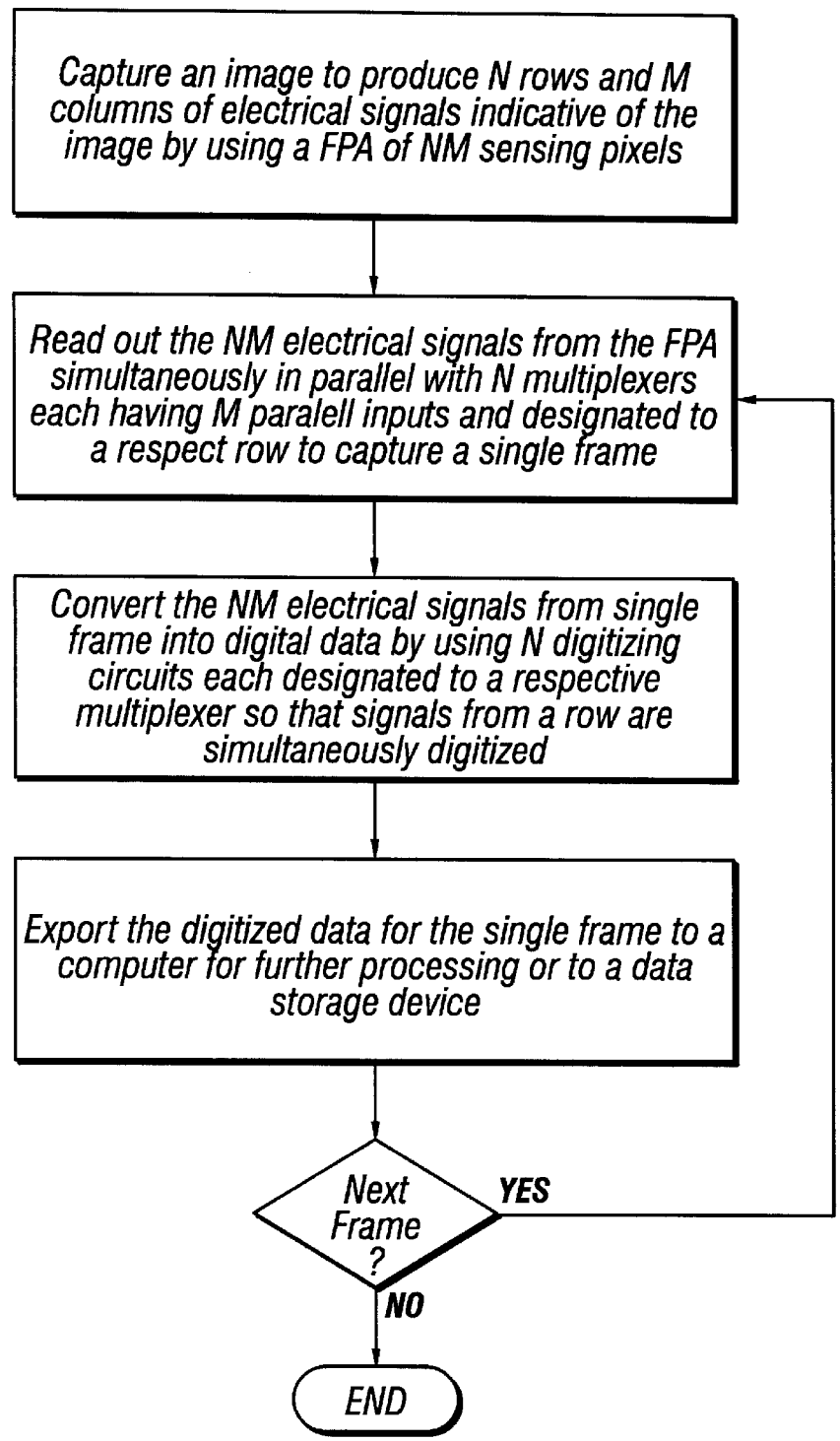
FIG. 3 is a flowchart showing one embodiment of the imaging processing based a FPA with N rows and M column and a row-parallel configuration.

FIG. 3 is a flowchart showing one embodiment of the imaging processing based a FPA with N rows and M column and a row-parallel configuration. Alternatively, a column-parallel configuration can be used in which M multiplexers are used. In general, pixels of a FPA may be arranged in a pattern other than rows and columns. The pixels may be partitioned into a plurality of groups with an equal number of pixels.

As an example of implementation, a FPA of 8×8 pixels can be used to form an image of 64 pixels. The preamplifiers may each have a bandwidth of 5 MHZ. A total of 8 multiplexer circuits and 8 respective digitizers may be used to each process a row of 8 pixels from the FPA. Thus, each row of pixels has a designated multiplexer circuit and digitizer. The common clock signal 142 may be at 10 MHZ which sets the frame rate at 1 million per second. During a hold period, the signals from a row held in each multiplexer are sequentially switched out. At each switch, a pulse is sent from a multiplexer timing circuit to the digitizers to sample and digitize the output. In certain applications such as measuring temperature of the object in a transient phenomena, an external trigger signal 152 generated by an event in the object may be used to initiate the storage of the data from the digitizers.

The system 100 may maintain a specified frame rate by proportionally increasing the size of the EPA 120 (hence, the numbers of the multiplexers and digitizers) and the data acquisition rate. For example, a clock signal of 40 MHZ may be used with a EPA of 32×32 pixels with 32 multiplexers and digitizers to maintain the frame rate of 1 million per second.

Although the present invention has been described in detail with reference to a few embodiments, various modifications and enhancements may be made. For example, different semicondcutor materials may be used to detect radiation at wavelengths other than infrared radiation, including visible and ultraviolet spectra. These and other variations are intended to be encompassed by the following claims.

What is claimed is:

1. A radiation detection system, comprising:
   an imaging module configured to receive radiation from an object;
   a sensing array disposed to receive said radiation from said imaging module and configured to have an array of sensing pixels which are responsive to said radiation to produce a plurality of pixel signals indicative of said radiation;
   a plurality of multiplexer circuits connected in parallel to said sensing array to simultaneously receive all of said pixel signals and configured to receive and hold said pixel signals according to a clock signal, wherein each of said multiplexer circuits has input ports to simultaneously receive a group of said pixel signals corresponding to a group of said pixels and sequentially outputs said group of said pixel signals at an output port; and
   a plurality of digitizers respectively connected to output ports of said multiplexer circuits and configured to respectively and simultaneously sample and digitize said pixel signals in parallel from said multiplexer circuits to produce a digital representation of said pixel signals from said sensing array, wherein each digitizer sequentially digitizes each pixel signal of said group of said pixel signals sampled and held by a respective multiplexer within one period of said clock signal before said respective multiplexer resets and receives group of pixel signals from said sensing array.

2. The system as in claim 1, further comprising at least one memory unit connected to said digitizers and configured to store said digital representation.

3. The system as in claim 1, wherein said imaging module comprises two convex lenses with different focal lengths.

4. The system as in claim 1, wherein said imaging module comprises first and second pairs of spherical reflectors, wherein each pair includes a convex spherical reflector and a concave spherical reflector that is confocal with said convex spherical reflector and has a radius of curvature greater than a radius of curvature of said convex spherical reflector.

5. The system as in claim 1, further comprising a plurality of preamplifiers connected to said sensing array and said multiplexers and configured in such a way that said preamplifiers respectively correspond to said sensing pixels to receive and amplify all of said pixel signals in parallel.

6. The system as in claim 1, wherein said sensing array comprises a semiconductor compound that includes mercury, cadmium, and telluride.

7. A method of detecting an image of an object, comprising:
   collecting radiation from an object;
   converting said radiation into an array of electrical signals by using a sensing array with a plurality of sensing pixels arranged in rows and columns;
   simultaneously receiving and holding said electrical signals in response to a clock signal by using a plurality of multiplexers that are connected to said sensing array with respect to one another in parallel, wherein each multiplexer simultaneously receives a respective group of said electrical signals corresponding to a row of said sensing pixels;
   sequentially outputting said respective group of said electrical signals to an output port of each multiplexer within one period of said clock signal before said multiplexer receives new electrical signals from said sensing array;
   simultaneously digitizing output signals from said multiplexers, within said one period of said clock signal, to produce a digital image of said object.

8. The method as in claim 7, further comprising simultaneously receiving and amplifying said electrical signals by using a plurality of preamplifiers that are connected to said sensor array in parallel.

9. The method as in claim 7, wherein said collecting radiation of said object is performed by using an imaging module comprises first and second pairs of spherical reflectors, wherein each pair includes a convex spherical reflector and a concave spherical reflector that is confocal with said convex spherical reflector and has a radius of curvature greater than a radius of curvature of said convex spherical reflector.

10. The method as in claim 7, wherein said sensing array comprises a semiconductor compound that includes mercury, cadmium, and telluride.

11. An imaging method, comprising:
   capturing radiation from an object by using an array of sensing pixels in N rows and M columns to convert said radiation into pixel signals that constitute a snapshot image of said object;
   simultaneously sampling and holding, in response to a clock signal, said pixels signals in N multiplexers connected in parallel and each having M parallel input ports to hold M pixel signals in each row in a respective multiplexer, wherein said pixels signals held in said N multiplexers represent said snapshot image;
   digitizing M pixel signals held in each multiplexer, one at a time within one period of said clock signal, by using N digitizers respectively connected to said N multiplexers so that N different pixels from different rows are simultaneously digitized in parallel at a time; and
   using output digital data from said N digitizers to construct a digital snapshot image of said object.

12. The method as in claim 11, further comprising using said digital snapshot image to determine a temperature map of said object at a given instant.

13. The method as in claim 11, further comprising using said digital snapshot image to determine a temporal variation in the temperature of said object.

14. The method as in claim 11, further comprising setting a clock frequency of said clock signal to not be smaller than M multiplied by a frame rate of said sensing array.

15. The method as in claim 11, wherein said capturing includes using an optical module comprises first and second pairs of spherical reflectors to image said object to said sensing array, wherein each pair includes a convex spherical reflector and a concave spherical reflector that is confocal with said convex spherical reflector and has a radius of curvature greater than a radius of curvature of said convex spherical reflector.

16. The method as in claim 15, further comprising adjusting said optical module to select radiation from a portion of said object to be captured by said sensing array.

* * * * *